United States Patent

Sung

Patent Number: 5,978,058
Date of Patent: Nov. 2, 1999

[54] THIN FILM TRANSISTOR LIQUID CRYSTAL DISPLAY WITH A SILICIDE LAYER FORMED INSIDE A CONTACT HOLE AND FABRICATING PROCESS THEREFOR

[75] Inventor: Chae Gee Sung, Miyagi-ken, Japan

[73] Assignee: Frontec Incorporated, Miyagi, Japan

[21] Appl. No.: 09/137,984

[22] Filed: Aug. 21, 1998

[30] Foreign Application Priority Data

Aug. 22, 1997 [JP] Japan ................................. 9-226865

[51] Int. Cl.$^6$ .......................... G02F 1/1343; G02F 1/136
[52] U.S. Cl. .............................................. 349/139; 349/43
[58] Field of Search ................................. 349/42, 43, 139

[56] References Cited

U.S. PATENT DOCUMENTS 5,414,547  5/1995  Matsuo et al. .......................... 359/67
5,554,864  9/1996  Koyama .
5,852,481  12/1998  Hwang ................................... 349/43

*Primary Examiner*—William L. Sikes
*Assistant Examiner*—Heidi L. Eisenhut
*Attorney, Agent, or Firm*—Brinks Hofer Gilson & Lione

[57] ABSTRACT

There are provided a thin film transistor liquid crystal display device in which an aluminum layer and an ITO layer can be connected with simplicity and certainty and a fabricating process therefor.

A thin film transistor liquid crystal display device comprising: a pair of substrates; a liquid crystal sandwiched therebetween; an aluminum layer formed on a surface in which the liquid crystal is held, of one substrate; an insulating layer covering the aluminum layer; a contact hole formed in the insulating layer so as to reach the aluminum layer; an indium tin oxide layer formed on the insulating layer including the inner surface of the contact hole; and a silicide layer lying between the indium tin oxide layer and the aluminum layer.

5 Claims, 3 Drawing Sheets

_5,978,058_

THIN FILM TRANSISTOR LIQUID CRYSTAL DISPLAY WITH A SILICIDE LAYER FORMED INSIDE A CONTACT HOLE AND FABRICATING PROCESS THEREFOR

BACKGROUND OF THE INVENTION

1. Field of the Invention

The present invention relates to a thin film transistor liquid crystal display device in which a connection method between an indium tin oxide layer and an aluminum layer on a substrate is improved and a fabricating process therefor.

2. Related Art

Aluminum as interconnect material has an advantage of a low resistivity and, in recent years, has widely been used in interconnection or an electrode, such as gate interconnection and source interconnection on a substrate, in a thin film transistor liquid crystal display device. When indium tin oxide (hereinafter referred to as ITO) which is used for a transparent pixel electrode of a thin film transistor liquid crystal display device or the like directly contacts with aluminum, however, oxygen in ITO is extracted by aluminum and as a result, a resistance of a contact section is increased.

Therefore, in a conventional thin film transistor liquid crystal display device, there has been adopted the structure of no contact between an aluminum layer and an ITO layer. For example, as shown in FIG. 3, a conductive barrier layer 33 made of tungsten or the like is provided in advance so as to cover an aluminum layer 32 formed on a substrate and a contact hole 35 which reaches the barrier layer 33 is formed in an insulating layer 34 so that the barrier layer 33 and the ITO layer 36 contact with each other, whereby the aluminum layer 32 and the ITO layer 36 are mutually brought into a electrical connection with the barrier layer 33 interposed therebetween. Alternately, as shown in FIG. 4, a metal layer 42 made of a metal other than aluminum and an aluminum layer 43 are formed on a substrate and a contact hole 45 which reaches an surface of the metal layer 42 is formed through an insulating layer 44 and the aluminum layer 43 so that the metal layer 42 and an ITO layer 46 are brought into contact with each other in the contact hole 45, whereby the aluminum layer 43 and the ITO layer 46 are electrically connected to each other with the metal layer 42 made of a metal other than aluminum interposed therebetween.

In the contact structure shown in FIG. 3, since an interconnect pattern is formed by two layers comprising the aluminum layer 32 and the barrier layer 33, there is a necessity for forming the insulating layer 34 after etching of the two layers. When the interconnect pattern is produced by the etching, however, different etchants are respectively applied to the aluminum and barrier layers, which requires two etching operations respectively using different etchants to make a process complicated. Besides, in the contact structure shown in FIG. 4, it is required that after the metal layer 42 made of a metal other than aluminum, the aluminum layer 43 and the insulating layer 44 are formed, the insulating layer 44 and the aluminum layer 43 are respectively etched to expose a surface of the metal layer 42, which is a problem because of increase in the number of process steps.

SUMMARY OF THE INVENTION

In view of the forgoing, the present invention has an object to provide a thin film transistor liquid crystal display device in which connection between an aluminum layer and an ITO layer can be achieved without increase in resistance in a simple fabricating process and the fabricating process therefor.

A first aspect of the present invention is directed to a thin film transistor liquid crystal display device comprising: a pair of substrates; a liquid crystal sandwiched therebetween; an aluminum layer formed on a surface in which the liquid crystal is held, of one substrate; an insulating layer covering the aluminum layer; a contact hole formed in the insulating layer so as to reach a surface of the aluminum layer; an indium tin oxide layer formed on the insulating layer including the inner surface of the contact hole; and a silicide layer lying between the indium tin oxide layer and the aluminum layer.

According to the above mentioned structure, since the ITO layer and the aluminum layer is connected with the conductive silicide layer interposed therebetween, the problem such as increase in resistance due to direct contact between the aluminum layer and the ITO layer and the like can be solved.

In a conventional structure, an insulating layer covers two layers consisting of an aluminum layer and a barrier layer, whereas in the present invention, since a silicide layer is formed only on the bottom surface of a contact hole provided in an insulating layer, the insulating film is required to cover only one aluminum layer, whereby a step coverage in the insulating layer is improved.

Since a contact hole is shallower by a thickness of the silicide layer formed on the bottom surface of the contact hole, a step height of an ITO layer formed inside the contact hole is alleviated, which in turn entails improvement on a step coverage in the ITO layer.

In addition, since an interconnect pattern is formed by one layer made of aluminum, one etching operation is sufficient, which makes processing of an interconnect pattern easier.

A second aspect of the present invention is directed to a thin film transistor liquid crystal display device, wherein the aluminum layer constitutes an underlayer side of a terminal section for a gate interconnect or a source interconnect disposed on a substrate and the indium tin oxide layer constitutes an upper layer side of the terminal section.

In the thin film transistor liquid crystal display device, the contact holes are respectively produced in a thin film transistor section and the terminal section for either the gate interconnect or the source interconnect. When depths of the contact holes are compared with each other, the depth of the contact hole in the thin film transistor section is only as deep as the thickness of a passivation film, whereas the depth in the terminal section of the gate interconnect or the source interconnect are deeper since it corresponds to the sum of thicknesses of a gate insulating film and the passivation film. While, in a contact structure of the present invention, there is an advantage that a contact hole is shallower and step coverage in an ITO layer is improved, it is more effective to adopt this structure in the terminal sections for the gate interconnect and the source interconnect as mentioned above.

As an example of a silicide layer, molybdenum silicide, tungsten silicide, titanium silicide or chromium silicide can be used and a thickness of the layer is preferably of the order of 200 to 600 Å. The reason is that if it is 200 Å or less, no barrier effect can be exerted and if it is 600 Å or more, a stress in the film is excessively large, whereby the layer is easy to be peeled off.

A third aspect of the present invention is directed to a fabricating process for a thin film transistor liquid crystal display device, the process comprising the steps of: forming a pattern made of an aluminum layer on one of a pair of substrates; forming an insulating layer on the aluminum layer; forming a contact hole in the insulating layer so that the contact hole reaches a surface of the aluminum layer; forming a silicide layer all over the surface of the substrate by means of a plasma CVD method; thereafter, removing the silicide layer formed on the surface of the insulating layer to form the silicide layer only on the aluminum layer of the bottom of the contact hole; then forming an indium tin oxide layer on the silicide layer; and inserting a liquid crystal between the one of a pair substrate and the other thereof.

According to the above mentioned constitution, a thin film transistor liquid crystal display device can be fabricated while increase in the number of process steps is suppressed as compared with conventional art. Since the silicide layer formed on the surface of the insulating layer is removed after the silicide layer is formed all over the substrate surface by means of the plasma CVD method, the silicide layer which firmly adhered to the underlayer can be formed only on the aluminum layer of the bottom of the contact hole. Since the silicide layer and the insulating layer are poorer in adhesion therebetween as compared with the adhesion between the silicide layer and the aluminum layer, the silicide layer on the surface of the insulating layer can be removed with comparative easiness.

A fourth aspect of the present invention is directed to a fabricating process for a thin film transistor liquid crystal display device, the process comprising the steps of: forming a pattern made of an aluminum layer on one of a pair of substrates; forming an insulating layer on the aluminum layer; forming a contact hole in the insulating layer so that the contact hole reaches a surface of the aluminum layer; forming a silicide layer all over the surface of the substrate by means of a sputtering method; thereafter, removing the silicide layer formed on the surface of the insulating layer to form the silicide layer only on the aluminum layer of the bottom of the contact hole; then forming an indium tin oxide layer on the silicide layer; and inserting a liquid crystal between the one of a pair substrate and the other thereof.

In the above mentioned fabricating process, after the silicide layer is formed all over the substrate by means of the sputtering method, the silicide layer on the surface of the insulating layer is removed and thereby, the silicide layer strongly adhered to the underlayer can be formed only on the aluminum layer of the bottom of the contact hole. Since the silicide layer and the insulating layer are poorer in adhesion therebetween as compared with the adhesion between the silicide layer and the aluminum layer, the silicide layer of the surface of the insulating layer can be removed with comparative easiness.

A fifth aspect of the present invention is directed to a fabricating process for a thin film-transistor liquid crystal display device, the process comprising the steps of: forming a pattern made of an aluminum layer on one of a pair of substrates; forming an insulating layer on the aluminum layer; forming a contact hole in the insulating layer so that the contact hole reaches a surface of the aluminum layer; forming a silicide layer all over the surface of the substrate while leaving photoresist used when the contact hole is formed thereafter, removing not only the photoresist but the silicide layer to form the silicide layer only on the aluminum layer of the bottom of the contact hole; then forming an indium tin oxide layer on the silicide layer; and inserting a liquid crystal between the one of a pair substrate and the other thereof.

In the above mentioned fabricating process, the silicide layer is formed all over the substrate surface while leaving the photoresist which was used at the time of formation of the contact hole with the photoresist intact and thereafter, there is applied a so-called lift off process that not only is the photoresist removed but the silicide layer on the photoresist is also removed, whereby the silicide layer strongly adhered to underlayer can be formed on the aluminum layer of the bottom of the contact hole. The photoresist which was used at the time of formation of the contact hole is again used, being intact, as a mask, whereby the silicide layer can be formed without preparation of a new mask.

DETAILED DESCRIPTION OF THE INVENTION

The present invention will be described in reference to the accompanying drawings in a detailed manner, but it should be understood that the present invention is not limited to embodiments described herein.

Figure 1:
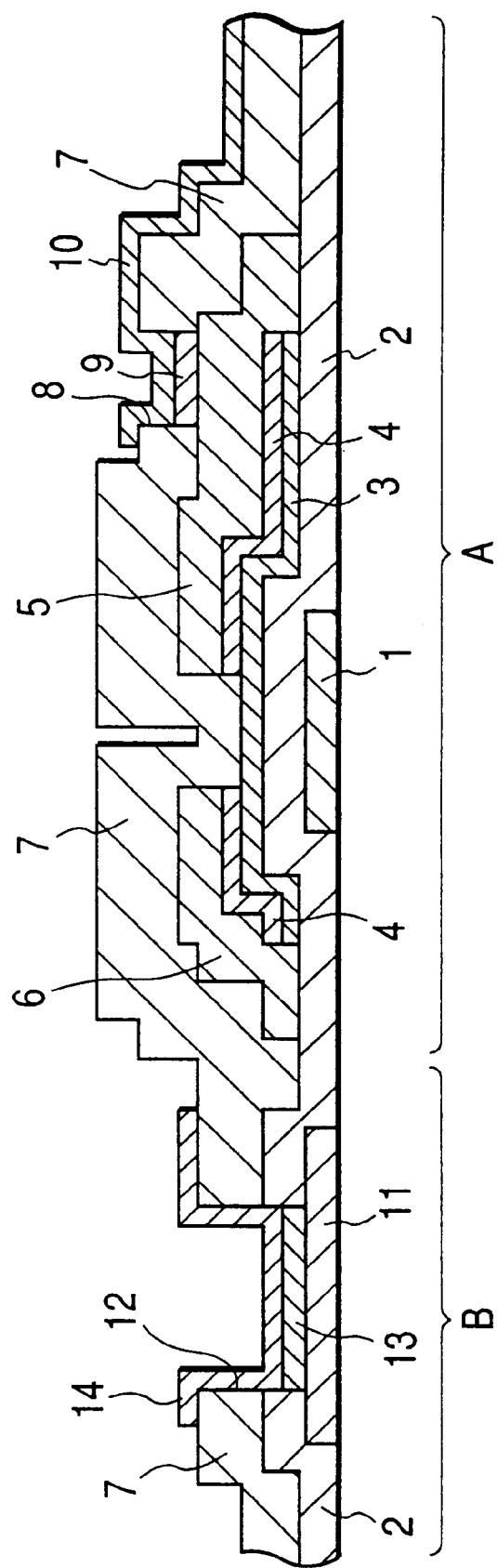
FIG. 1 is a schematic view of part of a thin film transistor liquid crystal display device of the present invention.

FIG. 1 is a schematic view of part of a thin film transistor liquid crystal display device of the present invention. A section indicated by a mark A shows a thin film transistor section and a section indicated by a mark B shows a terminal section for a gate interconnect or a source interconnect. While the two sections are located spaced from each other in an actual liquid crystal display device, they are shown in a adjacent manner to each other for consideration of convenience of illustration.

The thin film transistor section A will be first described.

The thin film transistor section A is fabricated according to the following steps of: forming a gate electrode 1 with a thickness of 1500 to 2000 Å made of aluminum, providing a gate insulating film 2 on the gate electrode 1, forming a semiconductor film 3 with a thickness of 1000 to 2000 Å made of amorphous silicon (a-Si) on the insulating film 2; forming $n^+$-type a-Si layer 4 with a thickness of 300 to 500 Å on the semiconductor film 3; and forming a drain electrode 5 and a source electrode 6 with a thickness of 1000 to 2000 Å made of aluminum on the $n^+$-type a-Si layer 4. There are further followed fabricating steps of: forming a passivation film 7 is formed on the drain electrode 5 and the source electrode 6 to cover the electrodes; and a contact hole 8 is formed in the passivation film 7. There are still further followed fabricating steps of: forming a silicide layer 9 with a thickness of 200 to 600 Å on the bottom surface of the contact hole 8; and forming an ITO layer 10 with a thickness of 1000 to 1500 Å which constitutes a pixel electrode on the silicide layer 9, wherein the drain electrode 5 and the ITO layer 10 (pixel electrode) are electrically connected to each other through the contact hole 8.

Then the terminal section B of the gate interconnect or the source interconnect will be fabricated according to the following steps of: forming a gate insulating film 2 and the passivation film 7 on the aluminum layer 11 constituting the underlayer side of the terminal section; and forming a contact hole 12 penetrating through the two layers. There are further followed fabricating steps of: forming a silicide layer 13 with a thickness of 200 to 600 Å on the bottom surface of the contact hole 12 as in the case of the contact hole 8 of the thin film transistor section A; and forming an ITO film 14 with a thickness of 1000 to 1500 Å on the silicide 13, wherein the aluminum layer 11 and the ITO layer 14 are electrically connected to each other through the contact hole 12.

With such a structure, since the ITO and the aluminum layers are connected through the conductive silicide layer, arise in resistance due to direct contact does not occur.

As an example of a silicide which can be used for the silicide, molybdenum silicide, tungsten silicide, titanium silicide, chromium silicide or the like can be used.

As an example of the passivation film, a (amorphous)—$SiN_x$:H, a-$SiN_x$, a-$SiO_2$:H and $SiO_2$ can be used.

Procedures in fabricating the contact hole and the ITO layer of a thin film transistor liquid crystal display device of the present invention will be described in reference to FIG. 2A to 2C.

Figure 2A:
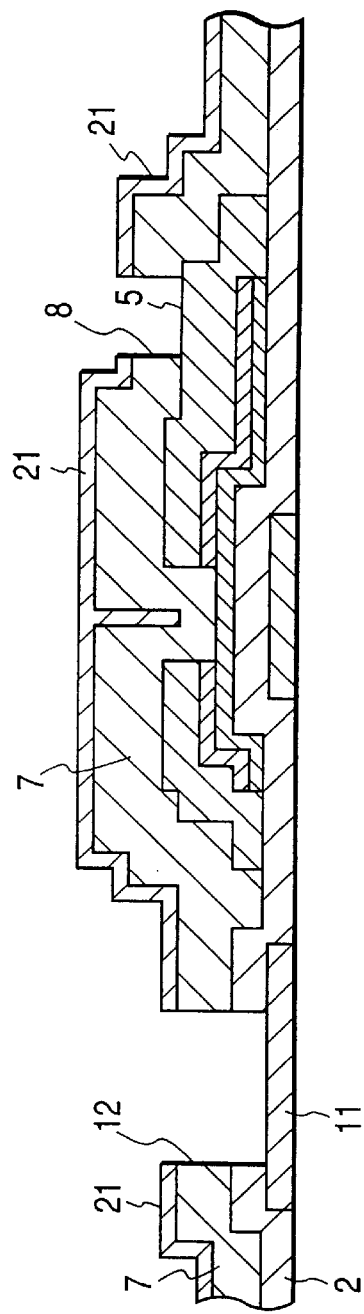
FIGS. 2A to 2C are views of a process flow for illustrating procedures in fabrication of a contact hole and an ITO layer of a thin film transistor liquid crystal display device of the present invention.

As shown in FIG. 2A, after a photoresist layer 21 is formed on a desired portion of the upper surface of the passivation film 7, contact holes 8, 12 are formed by dry etching of the passivation film 7 and the gate insulating film 2 with use of a $SF_6$ based or $CHF_x$ based gas.

Figure 2B:
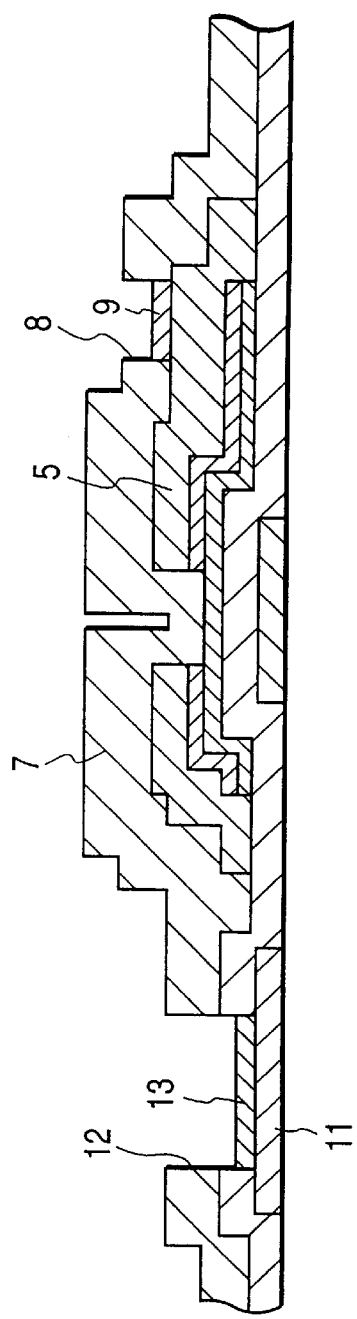

Then, as shown in FIG. 2B, the photoresist layer 21 is removed and the surface of the passivation film 7 and the contact holes 8, 12 are cleaned by ozone water or ozone water under ultraviolet irradiation. After surfaces of the drain electrode 5 made of an aluminum layer and the aluminum layer 11, exposed at the bottoms of the contact holes 8, 12, are cleaned with HF-water (1:100) to remove an oxide film on the aluminum surface, then the silicide layers 9, 13 is formed only on the bottoms of the contact holes 8, 12. A process for forming the silicide layers only on the bottoms of the contact holes will be described later.

Figure 2C:
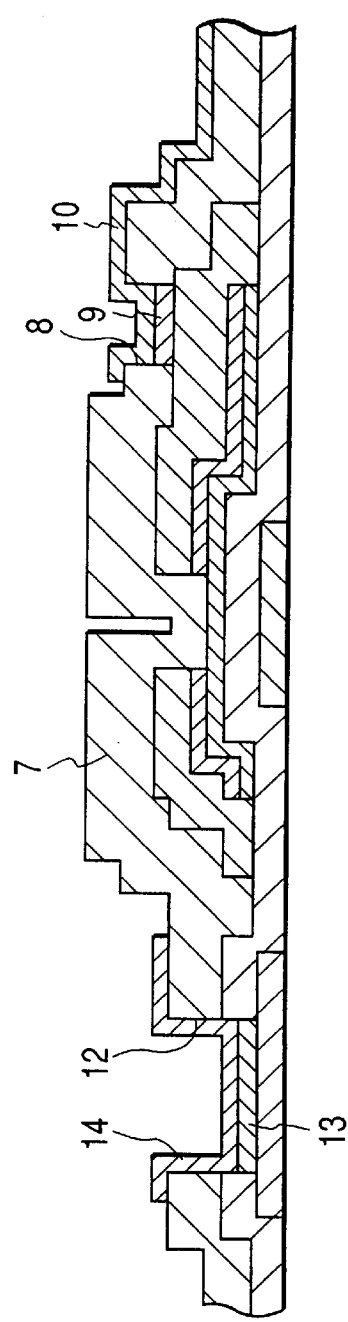
Figure 3:
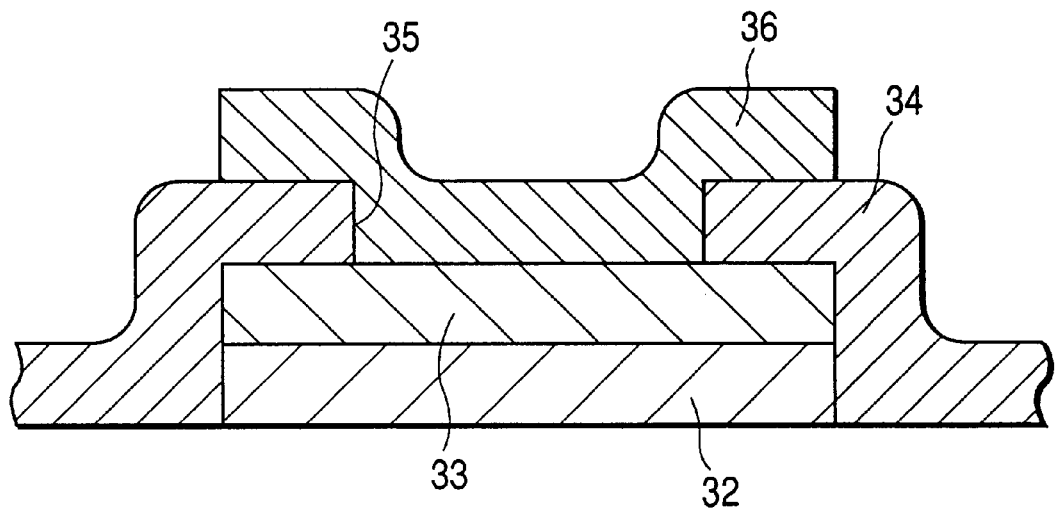
FIG. 3 is a schematic view showing one example of a conventional contact structure of an aluminum layer and an ITO layer.
Figure 4:
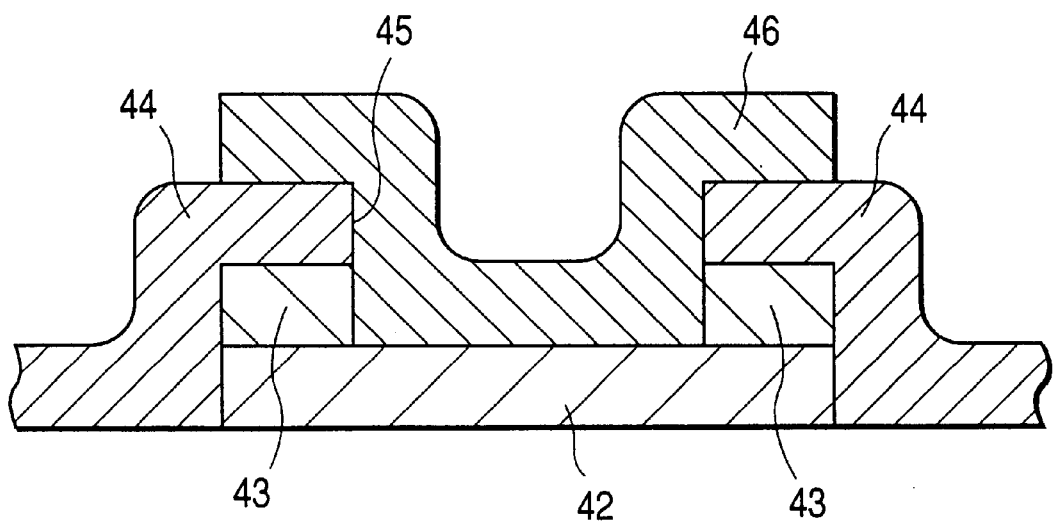
FIG. 4 is a schematic view showing another example of a conventional contact structure of an aluminum layer and an ITO layer.

Then, after an ITO layer is formed all over the substrate surface, the ITO layer is patterned, as shown in FIG. 2C, and ITO layers 10, 14 are thus formed so that the ITO layers cover from the upper surfaces of the silicide layers 9, 13 to the inner walls of the contact holes 8, 12 and to the upper surface of the passivation film 7.

In such procedures, a contact structure of a thin film transistor liquid crystal display device of this embodiment can be formed.

There will sequentially be described three processes, which can be applied to the process of FIG. 2B, and which can form the silicide layers 9, 13 only on the bottoms of the contact holes 8, 12.

First of all, a process in which the silicide layers 9, 13 are formed by means of a plasma CVD method is described. According to this process, the photoresist 21 is removed and the silicide layers 9, 13 are formed by means of the plasma CVD method. At this time, since the plasma CVD method is used, a silicide layer is formed all over the surface of a substrate. The silicide layer formed by the plasma CVD method shows a strong adhesion with the metal underlayer which is an aluminum layer, whereas the silicide layer has a poor adhesion with the underlayer of insulating material, which is the passivation film, whereby the silicide film formed on the passivation film can easily be removed by ultrasonic cleaning or the like with use of pure water and the silicide layers 9, 13 are selectively formed only on metal surfaces. That is, the silicide layers 9, 13 are formed only the bottoms of the contact holes 8, 12 at which the aluminum layers 5, 11 are exposed. In such a manner, when the plasma CVD method is used, since the silicide layers 9, 13 which strongly adhere to the underlayers are formed only on necessary portions, there can be saved time and labor which are required in masking a portion where no silicide is desired to be formed or in removing a silicide layer which is formed on an unnecessary portion.

A process in which the silicide layers 9, 13 are formed by means of a sputtering method is described. According to this process, first of all the photoresist layer 21 is removed and the silicide layers 9, 13 are formed on from the interiors of the contact holes 8, 12 to the upper surface of the passivation film 7 by the sputtering method. At this time, poor adhesion of the silicide layers 9, 13 with the passivation film 7 is utilized. That is, operations such as water spray or ultrasonic cleaning can be applied to mechanically remove only the silicide layers 9, 13 on the upper surface of the passivation film 7. In this operation, the silicide layers 9, 13 formed on the drain electrode 5 and the aluminum layer 11 are not removed. Thereby, the silicide layers 9, 13 can be formed only on the drain electrode 5 at the bottom of the contact hole 8 and only on the aluminum layer 11 at the bottom of the contact hole 12.

Alternately, the silicide layers 9, 13 can be formed by using the photoresist layer 21 as a mask, which is used in formation of the contact holes 8, 12. The silicide layers 9, 13 are formed from in the interior of the contact holes 8, 12 to on the upper surface of the photoresist layer 21. The photoresist layer 21 is removed and the silicide layers 9, 13 are simultaneously removed, whereby the silicide layers 9, 13 can be formed only on the aluminum layers at the bottoms of the contact holes 8, 12. In this process, since the photoresist layer 21 which is used for formation of the contact holes 8, 12 is again used as a mask, there is no need for a new mask.

While, in a conventional fabricating process for a thin film transistor liquid crystal display device, it has been required to etch two layers consisting of either the aluminum layer 32 and the barrier layer 33, or the metal layer 42 and the aluminum layer 43 in order to form an interconnect pattern, in a fabricating process for a thin film transistor liquid crystal display device of the embodiment, it is required that only the aluminum layer is etched and therefore, the number of process steps can be reduced.

While, in addition, in a conventional fabricating process for a thin film transistor liquid crystal display device, two layers consisting of either the aluminum layer 32 and the barrier layer 33, or the metal layer 42 and the aluminum layer 43 have had to be formed in a stacked condition when the insulating layer 34 or 44 is formed, in a fabricating process for a thin film transistor liquid crystal display device of this embodiment, step coverage of the insulating layer can be improved corresponding to decrease in step height as compared with that of a conventional case since it is only required that the passivation film 7 forms on the aluminum layer.

While, still in addition, in a conventional fabricating process for a thin film transistor liquid crystal display device, either the insulating film 34 or the insulating film 44, and the aluminum layer 43 have had to be formed in a stacked condition when the ITO layer 36 or 46 is formed, in a fabricating process for a thin film transistor liquid crystal display device of the embodiment, step coverage of the ITO layers 10, 14 can be improved corresponding to decrease in step height as compared with that of a conventional case since depths of the contact holes are buried by the silicide layers 9, 13, whereby the contact holes are shallower.

The scope of the present invention is not limited by the embodiments described above and the embodiments can be change or modified in various ways without departing the scope of the present invention.

Proper changes can be effected in concrete values, a concrete process for a treatment and conditions of treatment, such as kinds of film, a thickness of a film and the like, which are used in the embodiments.

As mentioned above, an ITO layer and an aluminum layer are connected to each other with a conductive silicide layer interposed therebetween in a thin film transistor liquid crystal display device of the present invention and there is no chance to increase a resistance due to direct contact between the ITO layer and the aluminum layer.

In a fabrication process for a thin film transistor liquid crystal display device of the present invention, it is required that only an aluminum layer is etched when an interconnect pattern is formed and the number of process steps can be reduced as compared with a conventional process of its kind.

In a fabrication process for a thin film transistor liquid crystal display device of the present invention, step coverage of the insulating layer can be improved corresponding to decrease in step height as compared with that of a conventional case since it is required that only the insulating layer forms on the aluminum layer when the insulating film is formed.

In addition, in a fabrication process for a thin film transistor liquid crystal display device of the present invention, step coverage of the ITO layers can be improved corresponding to decrease in step height as compared with that of a conventional case since depths of the contact holes are buried by the silicide layers and thereby the contact holes are shallower when the ITO layer is formed.

What is claimed is:

1. A thin film transistor liquid crystal display device comprising: a pair of substrates; a liquid crystal sandwiched therebetween; an aluminum layer formed on a surface of which the liquid crystal is held, of one substrate; an insulating layer covering the aluminum layer and one of the substrates; a contact hole formed in the insulating layer so as to reach a surface of the aluminum layer; an indium tin oxide layer formed on the insulating layer including the inner surface of the contact hole; and a silicide layer lying between the indium tin oxide layer and the aluminum layer only on the bottom surface of the contact hole.

2. A thin film transistor liquid crystal display device according to claim 1, wherein the aluminum layer constitutes an underlayer side of a terminal section for a gate interconnect or a source interconnect disposed on a substrate and the indium tin oxide layer constitutes an upper layer side of the terminal section.

3. A fabricating process for a thin film transistor liquid crystal display device, the process comprising the steps of: forming a pattern made of an aluminum layer on one of a pair of substrates; forming an insulating layer on the aluminum layer and one of the substrates; forming a contact hole in the insulating layer so that the contact hole reaches a surface of the aluminum layer; forming a silicide layer all over the surface of one of the substrates by means of a plasma CVD method; thereafter, removing only the silicide layer formed on the surface of the insulating layer to form the silicide layer only on the aluminum layer of the bottom of the contact hole; then forming an indium tin oxide layer on the silicide layer and the insulating layer; and inserting a liquid crystal between the one of a pair substrate and the other thereof.

4. A fabricating process for a thin film transistor liquid crystal display device, the process comprising the steps of: forming a pattern made of an aluminum layer on one of a pair of substrates; forming an insulating layer on the aluminum layer and one of the substrates; forming a contact hole in the insulating layer so that the contact hole reaches a surface of the aluminum layer; forming a silicide layer all over the surface of one of the substrates by means of a sputtering method; thereafter, removing only the silicide layer formed on the surface of the insulating layer to form the silicide layer only on the aluminum layer of the bottom of the contact hole; them forming an indium tin oxide layer on the silicide layer and the insulating layer; and inserting a liquid crystal between the one of a pair substrate and the other thereof.

5. A fabricating process for a thin film transistor liquid crystal display device, the process comprising the steps of: forming a pattern made of an aluminum layer on one of a pair of substrates; forming an insulating layer on the aluminum layer and one of the substrates; forming a photoresist layer on the insulating layer except a contact hole forming region; forming a contact hole in the insulating layer so that the contact hole reaches a surface of the aluminum layer with the photoresist layer being applied as a mask; forming a silicide layer all over the surface of one of the substrates while leaving the photoresist layer which was used at the time of formation of the contact hole; thereafter, removing not only the photoresist but the silicide layer only on the photoresist layer to form the silicide layer only on the aluminum layer of the bottom of the contact hole; then forming an indium tin oxide layer on the silicide layer and the insulating layer; and inserting a liquid crystal between the one of a pair substrate and the other thereof.

* * * * *

UNITED STATES PATENT AND TRADEMARK OFFICE
CERTIFICATE OF CORRECTION

PATENT NO. : 5,978,058
DATED : November 2, 1999
INVENTOR(S) : Chae Gee Sung

It is certified that error appears in the above-identified patent and that said Letters Patent is hereby corrected as shown below:

On the Title Page

In column 1, item [73], please change "Miyagi," to --Miyagi-ken,--.

In the Claims

In claim 3, line 14, please change "substrate" to --substrates--.

In claim 4, line 12, please change "them" to --then--.

In claim 4, line 14, please change "substrate" to --substrates--.

In claim 5, line 6, after "except" please insert --on--.

In claim 5, line 18, please change "substrate" to --substrates--.

Signed and Sealed this

Third Day of April, 2001

Attest:

NICHOLAS P. GODICI

Attesting Officer           Acting Director of the United States Patent and Trademark Office